United States Patent [19]

Gaertner

[11] 4,059,745

[45] Nov. 22, 1977

[54] OVERRIDE PROCESS CONTROL SYSTEM

[75] Inventor: Max H. Gaertner, Warminster, Pa.

[73] Assignee: Fischer & Porter Co., Warminster, Pa.

[21] Appl. No.: 727,667

[22] Filed: Sept. 29, 1976

[51] Int. Cl.² ............................................. G05B 11/01
[52] U.S. Cl. .................................... 364/108; 318/639
[58] Field of Search ........................ 235/150.1, 151.12; 318/639

[56] References Cited

U.S. PATENT DOCUMENTS

| 2,662,372 | 12/1953 | Offner | 318/639 X |
| 3,046,411 | 7/1962 | Steiner | 318/639 X |
| 3,083,321 | 3/1963 | Howe | 318/639 X |
| 3,223,107 | 12/1965 | Kleiss | 235/151.12 |

Primary Examiner—Eugene G. Botz

[57] ABSTRACT

An override process control system for regulating a process with a single final control element, such as a valve, from two or more process variables that are interdependent and must not exceed acceptable minimum and maximum limits. The system includes a like number of electronic controllers each acting to compare a respective process variable with a set point to produce an output signal reflecting the deviation of the process variable from the set point. The primary controller responsive to the process variable directly influenced by the setting of the final control element has its output signal applied thereto to regulate this element, whereas the other controllers which are responsive to secondary process variables operate on a standby basis. Coupled by individual lines to the several controllers is an override selector station which monitors the operation of the controllers, and in the event an unsafe signal is received from one of the standby controllers, forces the primary controller to respond to the unsafe signal until such time as the signal is again safe.

9 Claims, 2 Drawing Figures

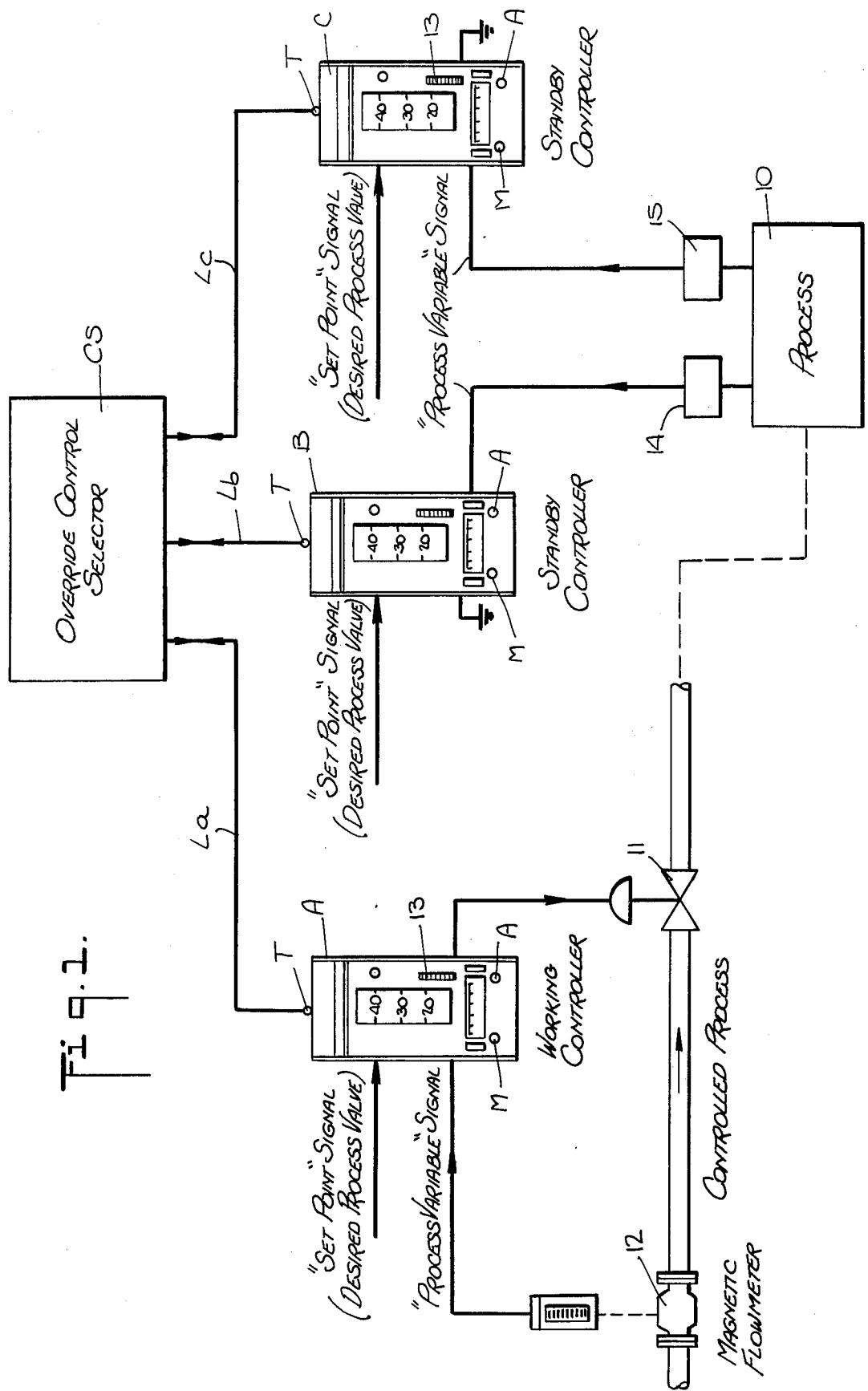

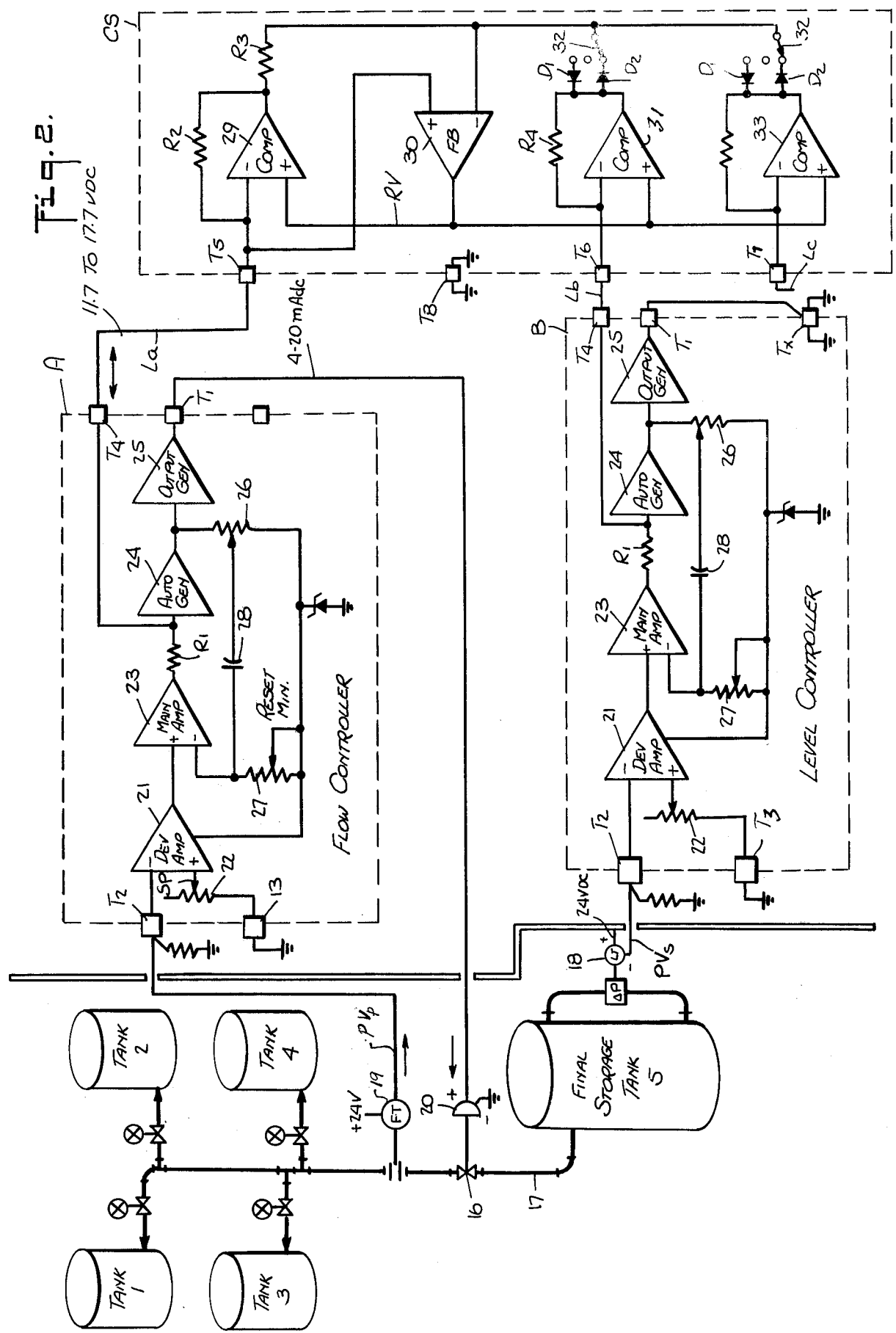

4,059,745

OVERRIDE PROCESS CONTROL SYSTEM

BACKGROUND OF INVENTION

This invention relates generally to process control systems, and more particularly to an override process control system in which a selector station operates in conjunction with two or more electronic controllers, only one of which governs a final control element, the other controllers being on a standby basis.

An electronic controller is a component in a process control loop that is subject to disturbances, the controller acting in conjunction with other devices to maintain a process variable at a desired value. The factor controlled may be flow rate, pressure, viscosity, liquid level, or any other process variable. In operation, the electronic controller receives, in terms of corresponding input signals, both the process variable and a set point, and it compares these electrical values to produce an output signal that reflects the deviation of the process variable from the set point. This output signal, when applied to a final control element, will directly or indirectly govern the process variable.

Thus one input signal to a controller may be derived from a flowmeter whose reading is converted into a corresponding electrical value, and the output signal may be impressed on a flow-regulating valve which is caused to assume an intermediate position between open and closed at which the flow rate conforms to the set point. The set point generator may be an internal component of the controller or a remotely-controlled device. A typical electronic controller is that manufactured by Fischer & Porter Co. O Warminster, Pa., and described in their Instruction Bulletin (1974) for the Series 53 EL 4000 Electronic Controller. The disclosure of this bulletin is incorporated herein by reference.

Variations in controller action are obtained by adjustment of parameters associated with the control modes and are available in several combinations. These modes of control action which are combined to adjust the controller output signal are known as proportional, reset and derivative.

Proportional action produces an output signal proportional to the deviation of the controlled process variable from the set point. The amount of deviation in terms of percentage required to move the final control element through the full range is known as the proportional band. Automatic reset action, also known as integral action, produces a corrective signal proportional to the length of time the controlled variable has been away from the set point, while derivative action, also known as rate action, produces a corrective signal proportional to the rate at which the controlled variable is changing. Manual reset action is an operator-actuated potentiometer controlled to produce a corrective signal directly proportional to the magnitude of the adjustment.

"Slideback" action permits the transfer from manual to automatic control without a sudden change in output signal. This means that the operator can switch the controller from manual to automatic without an instantaneous jump even when there is a difference between set point and process.

There are some practical situations in which it becomes essential to provide an override control system to regulate a process with only a single final control element from two or more process variables that are interdependent and which must not exceed certain maximum and/or minimum safe limits.

In a situation of this type, control of the process requires that the system always control from the variable that has the greater tendency at any instant to depart from the control point in the undesired direction. In this system, two or more process variables are related in such a way that either can be controlled by the same manipulated variable. An override control system for this purpose requires an override selector station associated with several electronic controllers respectively responsive to the interdependent process variables.

One known type of selector station for an override process control system is that manufactured by Fischer & Porter Co. and described in their Instruction Bulletin (1972) for Series 53 EL 3090-B Override Selector Station. Another known type is the SPEC 200 Automatic Selector Control Systems manufactured by Foxboro Corporation and described in their Technical Information TI 200-225, published September 1973.

In an override control system of the type heretofore known, the final control element is manipulated by the selector station to prevent two or more process variables from exceeding specified limits. Each process variable is fed to a respective electronic controller included in the override system, the set point of the controller representing a limiting safe operating point (maximum or minimum) for that variable. All controller outputs are fed to the selector station which transmits the highest or lowest controller output as determined by a high-low switch on the selector, to the final control element.

When the process variable of one or more of the controllers approaches an unsafe condition, the controller output will start to change to an extent determined by how unsafe the variable has become, as determined by the deviation from the set point and by the controller mode settings. At any given time, the process variable which is most unsafe is that producing the greatest output change tendency. And since this variable will produce in its associated controller the highest (or lowest) output, it will be chosen by the selector station to control the final operator.

To illustrate the operation of a typical system employing an override selector station of the known type, we shall assume an arrangement in which fluid is drawn into a compressor and discharged thereby into a process through a control valve (final control element). In order to avoid cavitation in a turbine pump, one must prevent loss of suction pressure in the event the discharge pressure is also low. To this end, a sensor on the suction side of the compressor transmits a process variable input signal to a "suction" electronic controller, while a sensor on the discharge side of the compressor transmits a process variable input signal to a "discharge pressure" electronic controller.

The output of the "suction" controller as well as that of the "discharge pressure" controller is applied to the override selector station whose output signal acts to govern the single final control element valve in the compressor discharge line. Normally, the output of the "discharge pressure" controller is selected by the override station to adjust the output pressure of the compressor. But if the suction pressure drops below the set point of the "suction" controller, the override station will then select this controller to take over control of the valve, in which case the "discharge pressure" controller is inactive.

In all override control systems of the type heretofore known, the function of the override station is to select the output signal from one of several process controllers, and to generate an equivalent output signal which is applied to the single final control element. A voltage signal proportional to the selected output signal is transmitted to each of the several electronic controllers which make up the system. In the then selected controller, this voltage signal is used as "feedback," whereas in the non-selected controllers, the voltage signal serves as a reset update to prevent these controllers from going into "Reset Wind Up."

Thus existing types of override selectors require an output line from each controller to the selector station and a second return connection for the feedback and reset update to each controller internal-feedback terminal. If, therefore, it were decided to convert a process control system having a group of electronic controllers to operate in conjunction with an override selector station of the type heretofore known, major wiring changes would be required, with a resulting prolonged down time.

Also while existing forms of electronic controllers are capable of switching over from automatic to manual operation, when such controllers are associated with an override selector station of the type previously known, one cannot effect such transfer by switch-over means already included in the controller. The reason this cannot be done is that in the conventional override system, the final control element is operated not by one of the controllers but by an output signal generated in the override selector station.

It is necessary, therefore, either to incorporate a manual-automatic transfer means in the override station or to provide a separate manual/automatic transfer station in the output line, further adding to the cost of the override installation.

SUMMARY OF THE INVENTION

In view of the foregoing, it is the main object of the invention to provide an improved and simplified override system for regulating a process with a single final control element from at least two process variables that are interdependent and which must not exceed acceptable minimum and maximum limits.

More particularly, it is an object of the invention to provide an override system of the above type which includes a like number of electronic controllers each responsive to a respective process variable, the output signal of the controller which is responsive to the primary process variable directly influenced by this final control element being applied to this element to govern its operation, the other controllers operating on a standby basis.

A significant feature of the invention is that the several electronic controllers are monitored by a selector station which, when an unsafe signal is received from one of the standby controllers, forces the output of the primary controller to respond to the unsafe signal until such time as the signal is again safe.

Monitoring is effected by an individual line between each controller and the selector station, over which line a signal is received by the station regarding conditions prevailing in each controller and over which same line a signal is returned to effect the desired reset control.

Among the advantages of the invention are the following: An existing process control system made up of several independent electronic controllers may be readily converted to an override system by providing a selector station in accordance with the invention, in which the existing relationship between the primary controller and the final control element is retained and the other controllers are put on a standby basis, one wire being connected from a point within each of these controllers to the selector station. This same wire is used to transmit signals in both directions between the selector station and each controller.

No special training is required for operating the primary controller in an override system in accordance with the invention, for its operation is essentially similar to that of any standard electronic controller. Thus automatic manual transfer is effected at the primary controller. Transfer between automatic and manual at the primary controller is balanceless bumpless with slideback, as with a sophisticated standard electronic controller.

OUTLINE OF THE DRAWINGS

For a better understanding of the invention as well as other objects and further features thereof, reference is made to the following detailed description to be read in conjunction with the accompanying drawings, wherein:

FIG. 1 is a block diagram of an override process control system according to the invention;

FIG. 2 is a schematic circuit diagram of the system.

DESCRIPTION OF THE INVENTION

The Basic System

Referring now to FIG. 1, there is shown an override process control system in accordance with the invention for controlling a process with a single final control element from three process variables that are interdependent and which must not exceed certain maximum and minimum safe or acceptable limits. While a system involving three interdependent process variables is disclosed, in practice the number may be two or more than three.

Since three process variables are involved, the system is provided with three identical electronic controllers, A, B and C, preferably any of the several Fischer & Porter type—Series 53 4000. Each controller compares a process variable value with a set point value in a deviation amplifier and derives therefrom a deviation signal that depends on the difference between these values. The deviation signal is applied to one input of a differential amplifier and compared therein with a reset voltage produced in a feedback path including an auto generator extending between the output of this amplifier and the other input of this amplifier to produce a reset drive voltage.

The output of the auto generator is connected to an output generator which converts the reset drive signal to a current output signal for operating a final control element. Each controller is provided with a terminal T which is connected to the input of the auto generator.

The process which is being controlled involves the controlled flow of a liquid into a process tank 10, the rate of flow being regulated by a valve 11 which acts as the final control element in a process control loop that includes electronic controller A. In order to determine the flow rate, a magnetic flowmeter 12 is interposed in the flow line in advance of valve 11 to provide a process variable signal which is applied to controller A, where it is compared with a set point signal representing the desired process value. The controller may be operated manually by pressing button M or automatically by pressing button A. The set point may be manually adjusted by turning the wheel 13 of a potentiometer.

As fluid is fed into process tank 10, which we shall assume contains a liquid bath in which a chemical action takes place, the level of fluid in the tank varies as well as the viscosity of the bath. It is important not only that the flow rate of fluid fed into the tank be maintained within certain acceptable limits, but also that the liquid level in the tank not go too high or too low, and that the viscosity of the bath also remain within safe limits.

Hence to sense the liquid level in process tank 10, a level transmitter 14 is provided which supplies a process variable to controller B. To sense the viscosity of the bath, a viscosity transmitter 15 is provided to supply a process variable to controller C. The three process variables are interdependent, for the liquid level and the viscosity depends on the flow rate.

However, the flow rate process variable is the primary variable, for it is directly influenced by the setting of the single final control element 11 of the system, whereas the other variables are secondary, for they are indirectly affected by this setting.

In the arrangement in accordance with the invention, only controller A is operative to control final control element 11, and the output current signals of controllers B and C are not used to carry out a control function. Controller A is therefore referred to as the working or primary controller, and controllers B and C as the standby controllers. But all three controllers are operative to determine whether the process variables to which they are responsive lie within safe limits, and to generate at its terminal T a reset drive voltage which depends on the difference between the deviation signal and the proportional plus integral feedback voltage.

If, therefore, in normal operation, all three process variables are within safe limits, working controller A, which responds only to the primary process variable, will exclusively govern the final control element. But while the control of the final control element by controller A is always such as to maintain flow rate within acceptable limits, a situation may arise in which, despite this fact, an aberration is encountered in which the liquid level or the viscosity process variable falls below an acceptable minimum or rises above an acceptable maximum.

It is essential, therefore, when this occurs for the standby controller which responds to the aberration to take over the control of the final control element. To accomplish this purpose, an override control selector CS is provided which is coupled by individual lines La, Lb and Lc, to the terminals T of controllers A, B and C, so that only a single connection exists between the selector and each controller.

Control selector station CS senses the voltage and current on each of lines La to Lc (or a greater number of lines), and when the reset drive voltage from a standby controller increases or decreases to an unsafe level as compared to the primary controller signal on line La, then the current to the standby controller will move toward zero and change direction. This reverse current is sensed by the selector and the standby controller is accepted as a new input, all other lines including line La to primary controller A then becoming outputs which follow this new input.

Selector station CS functions as a voltage and current monitor with respect to each line leading to a controller, with a safe and unsafe direction of current flow. When the current in a given line is forced in the unsafe direction by an external factor, circuits in the control selector couple the voltage of the unsafe signal to the primary controller and to all other lines.

Therefore, the primary controller is forced to respond to the unsafe signal, this signal being used as a source for the next comparison to produce an output signal for governing the final control element. The input to the control selector is the reset drive voltage from the selected controller into a high impedance circuit. The reset update-voltage is returned to the non-selected controllers in a very low impedance voltage signal, selection being automatic, using the currents which are required by the selector station (plus and minus) to maintain this voltage level.

· Simplified Schematic

Referring now to FIG. 2, there is shown in simplified schematic form, an override control system according to the invention which includes only the primary electronic controller A and one secondary electronic controller B, the two controllers operating in conjunction with control selector CS. In this instance, the final control element 16 is a valve interposed in a gravity feed pipe 17 leading from a set of four tanks 1 to 4 whose fluid outputs are controlled by manually-operated valves. The blended fluids from these tanks are fed through valve 16 into a final storage tank 5.

The level of liquid in storage tank 5 is determined by a differential-pressure level transmitter 18 whose electrical output signal represents this process variable. The flow rate through gravity pipe 17 is sensed by a flow transmitter 19 whose electrical output signal represents flow rate and therefore reflects this process variable.

Since flow rate is directly influenced by the setting of the final control element 16, this process variable is referred to as the primary process variable PVp, whereas the liquid level in final tank 5 is indirectly influenced by the setting of the final control element and is therefore referred to as the secondary process variable PVs. Inasmuch as the flow rate into the final storage tank determines the level of liquid therein, the primary and secondary process variables PVp and PVs are interdependent. While only a single secondary process variable is included in this override system, it is to be understood that, in practice, two or more secondary process variables may be involved.

Electronic controllers A and B are preferably of the F&P Series 53 4000 type. Controller A is responsive to the primary process variable PVp to produce an output signal at output terminal $T_1$ which is applied to actuator 20 for valve 16, thereby creating a conventional process control loop. Primary process variable PVp is applied to input terminal $T_2$ which is connected to the input of a deviation amplifier 21 in controller A which serves to compare this variable with a set point SP determined by the adjustment of a local set point potentiometer 22 connected to grounded input terminal $T_3$, the slider of the potentiometer being connected to the second input of deviation amplifier 21. This deviation amplifier is a high impedance, highly stable differential amplifier whose output reflects the difference between the process variable and the set point.

The output of deviation amplifier 21 is fed to the positive input of a main amplifier 23 which is essentially a differential dc amplifier. The output signal from main amplifier 23 is fed through a resistor $R_1$ (22K) to an auto generator 24 which, in practice, may consist of a single stage amplifier. Auto generator 24 provides a signal which goes to an output generator 25 and serves as a feedback signal to main amplifier 23 through a reset-proportional band circuit.

The reset-proportional band circuit is defined by a proportional band adjustment potentiometer 26 connected in series with a reset adjustment potentiometer 27 between the output of auto generator 24 and the negative input of main amplifier 23, the slider of potentiometer 26 being connected through reset capacitor 28 to the negative input. The auto reset feedback circuit is an RC lead network in the feedback path in which the time constant is altered by changing the value of a variable resistance. The reset circuit serves to change the value of the controller output signal at a rate proportional to the deviation divided by the proportional band until the error is reduced to zero.

In practice, the reset drive voltage at the input of auto generator 24 which appears at terminal $T_4$ lies in a range of 11.7 to 17.7 volts dc, the output of this generator being fed to output generator 25 which converts the voltage from auto generator 24 to a current output at terminal $T_1$ in the range of 4 to 20 mAdc. This current output is applied to valve actuator 20.

The secondary process variable PVs from level transmitter 18 is applied to input terminal $T_2$ of electronic level controller B which is identical to the primary flow controller A, this process variable being compared with a set point SP as determined by the setting of local set point potentiometer 22 in this controller. However, the current output signal at terminal $T_1$ of the level controller is not employed to operate a control element but is fed to grounded output terminal $T_x$.

A single line $L_a$ connects terminal $T_4$ (reset drive voltage) of primary controller A (flow controller) and a terminal $T_5$ of the override control selector CS, and a single line $L_b$ connects terminal $T_4$ of standby controller B (level controller) and a terminal $T_6$ of the control selector. For a second standby controller (not shown), a single line $L_c$ from this controller goes to terminal $T_7$ of control selector CS. Terminal $T_8$ of the control selector is the common terminal.

Terminal $T_5$ of control selector CS is connected to the negative input of a differential amplifier 29 acting as a primary comparator whose output is connected to the same input via a feedback resistor $R_2$ (4.7K). The output of comparator 29 is connected through a resistor $R_3$ (10K) to the negative input of a differential amplifier 30 whose positive input is connected to terminal $T_5$ to provide a bias voltage thereto. The output of feedback amplifier 30 is applied to the positive input of comparator 29 to provide a reference voltage therefor. This reference RV voltage, which appears on a bus, is determined by the input to comparator 29 (the reset drive voltage) and the output thereof.

Terminal $T_6$ of the control selector which communicates with standby controller B is connected to the negative input of a differential amplifier 31 acting as a secondary comparator whose output is connected to the same input via a feedback resistor $R_4$ (4.7K) which is the same value as resistor $R_2$. The output of feedback amplifier 30 is applied to the positive input of secondary comparator 31 to provide a reference voltage therefor. The output of comparator 31 is connected to one terminal of both diodes $D_1$ and $D_2$. The other terminals of diodes $D_1$ and $D_2$ are connected through a selector switch 32 to the output of comparator 29 through resistor $R_3$ and the negative input of feedback amplifier 30 to provide for "high" or "low" select operation, depending on the switch position. During non-override operation, diode $D_1$ or $D_2$ selected by switch 32 is non-conducting due to reverse bias which appears at the output of secondary comparator 31.

That is to say, diode $D_1$ forward conducts when there is a lower voltage at the output of comparator 31, or diode $D_2$ forward conducts when there is a higher voltage. Switch 32 selects which condition can exist. The voltage across the selected diode depends on the difference between the output of comparator 31 and the output of comparator 29 through resistor $R_3$. The output voltage of comparator 31 is the result of current flow through resistor $R_4$ as required to maintain a voltage at the negative input of comparator 31 equal to reference voltage RV.

Terminal $T_7$ is connected to one input of another secondary comparator 33 whose associated circuit is identical to that of comparator 31, this stage of the control selector being reserved for another standby controller (not shown). Hence for purposes of understanding the control selector, we shall consider only the operation of comparator 31.

In operation, control selector CS communicates between two or more electronic controllers in an override system through an automatic impedance control circuit in which resistor $R_3$ (10K) and diodes $D_1$ or $D_2$, acting as non-linear elements in the input of feedback amplifier 30, determine which comparator will set the reference voltage level on the bus line RV.

The reference voltage is initially set by the reset drive voltage taken from the primary controller A and applied to primary comparator 29. Each controller is connected as an output to a respective voltage follower. The selected controller has the same reset drive voltage as the reference voltage; hence minimal current is communicated to the controller, so that the control selector appears as a high impedance thereto. The non-selected controllers are forced to follow via the output from the low impedance voltage follower. The control selector can select the highest, the lowest or operate between two or more signals set by the combination of selected high and low.

CONTROL SELECTOR/FLOW CONTROLLER OPERATION IN NON-OVERRIDE MODE

Referring to FIG. 2 as representative of any typical control system, control selector CS senses each controller reset drive voltage. This voltage is approximately 11.7 to 17.7 Vdc and corresponds to the controller output current of 4 to 20 mAdc. In practice, the input voltage to the control selector is limited only by the supply voltage, the reset voltage stated here being a function of the associated controllers.

The high-low selector switches 32 are shown as connected to the "low" diodes $D_2$. We shall first assume that the system is operating in the non-override mode. In this mode, the reset of the secondary or level controller B is forced to track the primary or flow controller A whose reset drive voltage is at 50% and therefore 14.7 Vdc. This 14.7 Vdc reset drive voltage is applied to terminal $T_5$ connected to the negative input of comparator 29 where it is compared with reference voltage RV.

If the reference voltage is lower than the reset drive voltage at terminal $T_5$, the output of comparator 29 will decrease. This decrease will be sensed by feedback amplifier 30 whose output will cause the reference voltage to increase until it equals the reset drive voltage at terminal $T_5$. Hence the reference voltage on bus RV becomes 14.7 Vdc. This is the same as the reset drive voltage on primary controller A; consequently there is no loading on comparator 29 and the input impedance of comparator 29 as seen by primary controller A is high during the non-override mode of operation.

CONTROL SELECTOR/LEVEL CONTROLLER OPERATION IN NON-OVERRIDE MODE

During the non-override mode, the standby or level controller B has its reset updated so that it is equal to the reference voltage RV of the control selector. The deviation of level controller B, not having its own feedback, will drive its main amplifier 23 "off scale." We shall assume by way of example that the voltage at the output of main amplifier 23 which is on one side of resistor $R_1$ (22K) is + 23 Vdc and that the voltage (reset drive voltage) at the other side of this resistor is the reset update voltage from comparator 31 of the control selector which is 14.7 Vdc. Hence a current of +0.377 mAdc is caused to flow through the 22K ohm resistor $R_1$.

To maintain the reset drive voltage of level controller B at 50%, the + 0.377 mAdc current from main amplifier 23 is nulled out by a − 0.377 current from the output of comparator 31 in control selector CS through its 4.7 K ohm resistor $R_4$. The output voltage of secondary comparator 31 measures − 1.772 Vdc with respect to the output voltage of primary comparator 29, which is equal to the reference voltage. Hence selector diode $D_2$ connected to the output of comparator 31 is reverse biased and is non-conductive.

AUTOMATIC TRANSFER TO OVERRIDE CONTROL AT LEVEL CONTROLLER

We shall now assume that the deviation signal at the input to main amplifier 23 in level controller B is reduced and may even begin to reverse itself due to an increase in the liquid level in final tank 5 initially below the "limit" set point of level controller B. When this happens, main amplifier 23 will snap out of saturation and take control of its own feedback, and the current through the 22 K ohm resistor $R_1$ then changes from a positive current to a small steady negative current at the same 50% output level. Now the output of level controller B will begin to slowly decrease at its own reset rate. Because the input impedance of control selector CS has changed, it looks high to level controller B.

TRANSFER TO OVERRIDE MODE AT CONTROL SELECTOR

Before transfer is completed, reference voltage RV will continue to follow the output of primary comparator 29 which is set by flow controller A. The output from secondary comparator 31 will quickly change from − 0.377 mAdc to a small, steady positive current and follow the new reset voltage set by level controller B. The voltage at the output of secondary comparator 31 has now changed to + 0.6 vDc with respect to reference voltage RV and the output of comparator 29, causing diode $D_2$ in the output of this comparator to be forward biased and turned "on." When diode $D_2$ is "on," then applied to the negative input of feedback amplifier 30 is the output of secondary comparator 31 through diode $D_2$ as well as the output of primary comparator 29 through the 10 K ohm resistor $R_3$. Because the impedance of diode $D_2$ is much less than 10 K ohm, effective control of feedback amplifier 30 is relinquished by primary comparator 29 to secondary comparator 31.

The small steady current which results from the + 0.6 Vdc (forward diode drop) at the output of secondary comparator 31 will flow back to level controller B, but will not affect its operation. However, reference voltage RV in control selector CS will now follow the reset drive voltage derived from level controller B through secondary comparator 31 and feedback amplifier 30.

Reference voltage RV is no longer under the control of primary comparator 29; for the reference voltage, which is now decreasing, follows level controller B. The output current of primary comparator 29 will decrease rapidly to a value required to hold the reset update in flow controller A at the reference voltage level. Current from the output of primary comparator 29 is split two ways, a small portion thereof serving to forward bias diode $D_2$ in the output of secondary comparator 31 to render it conductive, and the remainder acting to update the reset in flow controller A through resistor $R_2$.

AUTOMATIC TRANSFER TO OVERRIDE AT FLOW CONTROLLER

Before transfer to the override mode takes place, control selector CS follows the reset voltage in flow controller A, and the control selector appears as a high impedance to the output of main amplifier 23 in the flow controller, even through the 22 K ohm resistance of resistor $R_1$.

At the time of transfer to override, current begins to communicate between flow controller A and control selector CS. Main amplifier 23 of flow controller A tries to maintain control through resistor $R_1$ until this amplifier runs out of voltage, at which point it is then quickly overpowered by current from the control selector. This happens without a bump at the input to auto generator 24 of flow controller A. The control selector now appears as a low impedance voltage source.

The reset update voltage from control selector CS performs a dual function, for it not only updates the reset in flow controller A but it forces the flow controller output to follow the selected level controller so that now the final control element proceeds to correct for the aberration which led to override operation. Output current from the flow controller continues to feed final control element 16, which is now set by level controller B through control selector CS, until the desired correction is effected, at which point bumpless transfer back to the non-override mode takes place automatically.

While there has been shown and described a preferred embodiment of an override process control system in accordance with the invention, it will be appreciated that many changes and modifications may be made therein without, however, departing from the essential spirit thereof.

I claim:

1. An override process control system for regulating a process from a single final control element from at least two process variables that are interdependent and must not exceed safe minimum and maximum limits, the first process variable being directly influenced by the setting of the final control element, said system comprising:

A. a primary electronic process controller responsive to the first process variable to compare this variable with a first set point to produce in a non-override mode a first output signal that reflects the deviation of the first process variable from the set point and is applied to said final control element to govern this element accordingly;

B. a standby electronic process controller responsive to the second process variable to compare this variable with a second set point to produce in the non-override mode a second output signal that reflects the deviation of the second process variable from the set point, which second signal under certain conditions may assume an unsafe value to produce an unsafe signal; and C. an override control selector station coupled by individual lines to said controllers to monitor the operations thereof, and in the event an unsafe signal is received from the standby controller, to cause said controllers to operate in an override mode in which the primary controller responds to the unsafe signal from the standby controller to govern the final control element accordingly.

2. A system as set forth in claim 1, wherein each of said controllers includes a deviation amplifier to compare the applied process variable with the set point to produce a deviation signal which is fed to one input of a differential main amplifier whose output is fed back through an auto generator and a reset circuit to the other input of said main amplifier whereby a reset drive voltage is yielded at a terminal connected to the input of said auto generator.

3. A system as set forth in claim 2, further including a resistor interposed between said terminal and said main amplifier.

4. A system as set forth in claim 2, wherein said control selector station is coupled by an individual line to the terminal of each controller to cause the reset drive voltage in said primary controller in the non-override mode to be determined by the main amplifier output voltage of the primary controller and to cause the reset drive voltage in said primary controller in the override mode to be determined by the main amplifier output voltage of the secondary controller.

5. A system as set forth in claim 2, wherein each controller further includes an output generator coupled to the output of said auto generator to convert the voltage yielded thereby into a corresponding current.

6. A system as set forth in claim 4, wherein said control selector station includes a comparator which compares the voltage at the terminal of said primary controller with a reference voltage, and a secondary comparator which compares the voltage at the terminal of said secondary controller with the same reference voltage, said reference voltage in the non-override mode being determined by the reset voltage from said primary controller and in the override mode by the reset voltage from said secondary controller.

7. A system as set forth in claim 6, wherein each comparator is constituted by a differential amplifier including a feedback resistor connected between the output thereof and the terminal input thereto.

8. A system as set forth in claim 7, further including a differential feedback amplifier which compares the terminal input of said primary comparator with the output thereof to produce a feedback voltage which constitutes the reference voltage applied to the other input of said primary comparator.

9. A system as set forth in claim 8, wherein said secondary comparator is selectively coupled through each one of a pair of diodes of selected polarity determined by a switch to one input of said feedback amplifier whereby in the override mode the reference voltage is determined by said secondary comparator.

* * * * *